March 28, 1967 H. T. ATWOOD ET AL 3,311,068
DOUGH DIVIDING APPARATUS
Filed Oct. 13, 1964 2 Sheets-Sheet 1
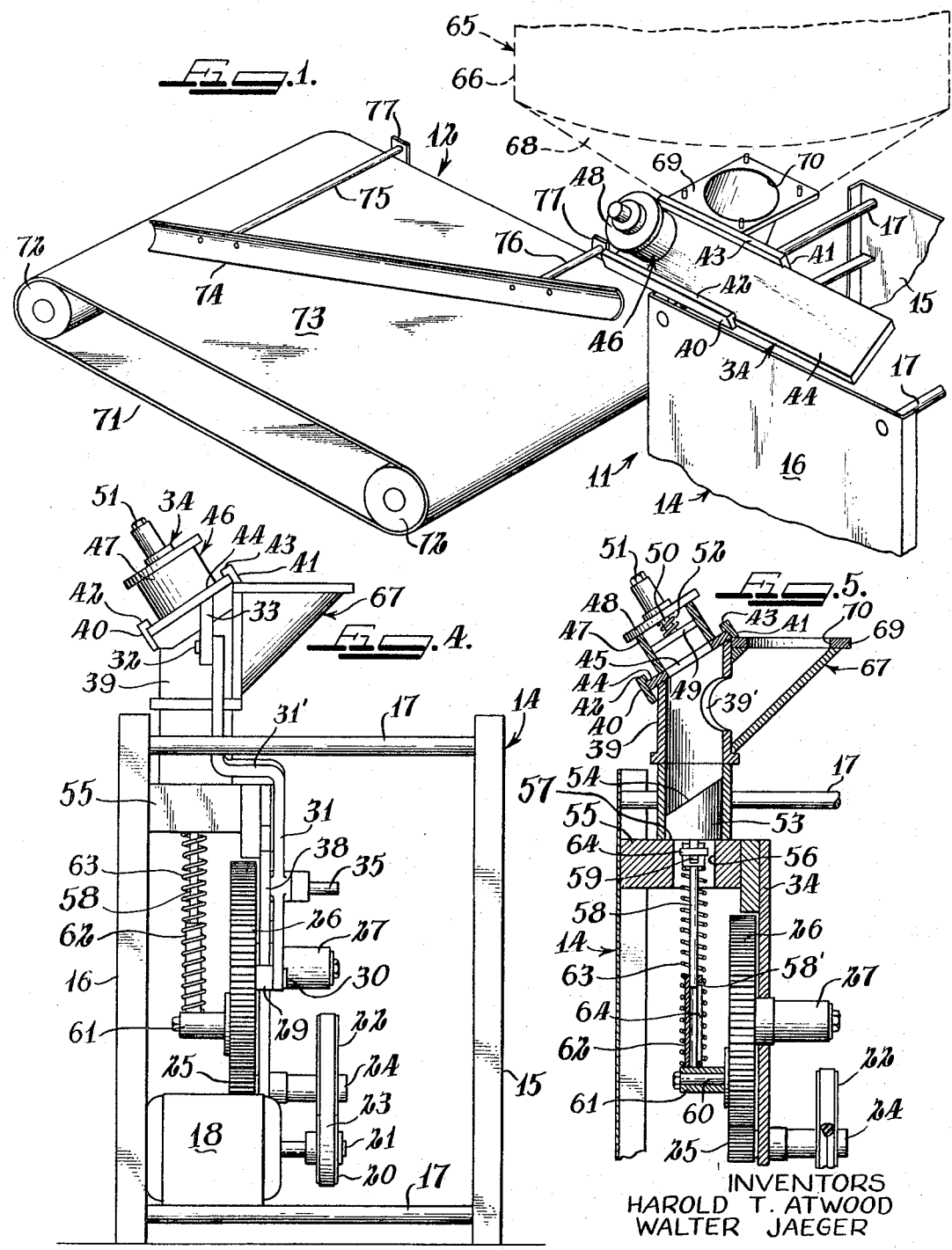
INVENTORS
HAROLD T. ATWOOD
WALTER JAEGER
BY Benjamin Schlosser
Atty.

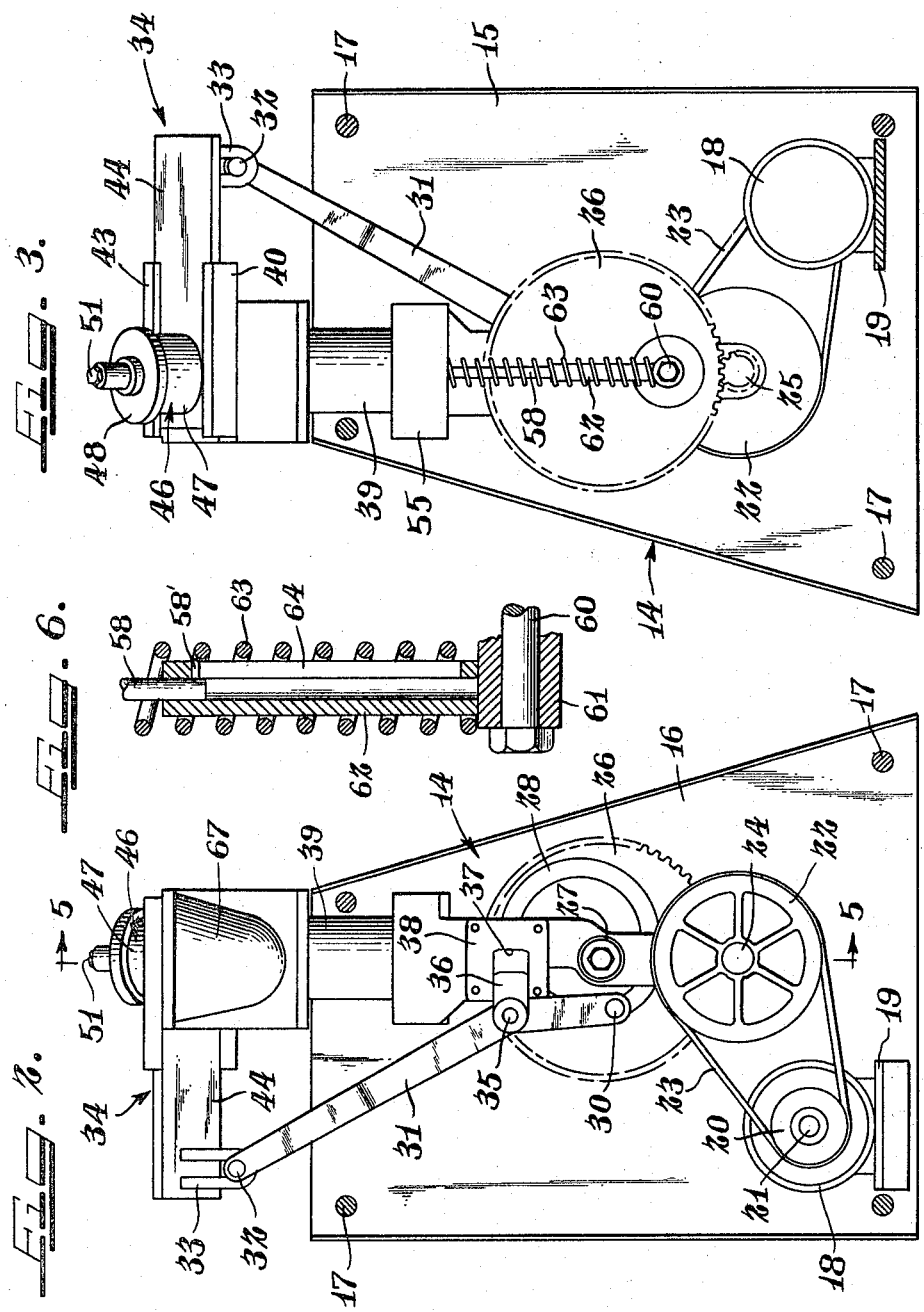

United States Patent Office 3,311,068
Patented Mar. 28, 1967

3,311,068
DOUGH DIVIDING APPARATUS
Harold T. Atwood, Chicago, and Walter Jaeger, Blue Island, Ill., assignors, by mesne assignments, to The Atwood Corporation, Dolton, Ill., a corporation of Illinois
Filed Oct. 13, 1964, Ser. No. 403,484
9 Claims. (Cl. 107—4)

This invention relates to an apparatus for dividing a supply of dough into individual units of uniform quantity, and rolling said units into balls for freezing and storage until they are to be used.

In accordance with the invention, dough, in its normal soft condition, is fed into a hopper having a discharge opening in communication with an inlet opening in the cylindrical wall of an open top tubular cylinder in which a piston is reciprocated. The dough is preferably fed into the hopper continuously, as dough is discharged from the tubular cylinder, to provide a continuous operation, but, if desired, may be fed as a single mass to provide a batch operation.

The tubular cylinder is sealed above and below the inlet opening which is in communication with the discharge opening of the hopper through a short substantially vertical chute. The upper end of the cylinder is sealed by either the flat base plate of a carriage that is reciprocated across said upper end, or by an inverted scaling cup that extends upwardly from the base plate. The inverted sealing cup surrounds an opening in the base plate that passes over the top of the tubular cylinder as the carriage is reciprocated. The upper surface of a piston that is slidably mounted in the tubular cylinder seals it below the inlet opening. The inlet opening is sealed by either the side of the piston, or by the dough that flows from the discharge opening at the bottom of the hopper into the chute that leads from the discharge opening of the hopper to the inlet opening.

Since the tubular cylinder is completely sealed between its upper end and the top surface of the piston, the downward movement of the piston below the inlet opening of the tubular cylinder creates suction in the cylinder that pulls dough from the chute through the inlet opening into the cylinder. As the piston moves upwardly, its upper edge cooperates with the inlet opening in the cylindrical wall of the cylinder to cut off the dough extending through said inlet opening, and pushes it into the interior of the tubular cylinder. The upper face of the piston is inclined at an angle of about 45°, with its highest edge portion in alignment with the inlet opening of the cylinder. The inclination of the upper surface of the piston provides a sharp edge in vertical alignment with the inlet opening which improves the cutting action of the piston, and also guides the cut off portion of the dough, to cause it to move downwardly and inwardly into the hollow interior of the cylinder. A flat top piston does not provide the guiding action, and part of the dough may get pushed back into the chute if a flat top piston is used. The upper edge of the tubular cylinder is cut off at an angle of about 45° and is parallel to the top surface of the piston.

The carriage that is reciprocated across the open top of the tubular cylinder comprises a flat base plate having an opening therein, and an inverted scaling cup extending over said opening. The carriage is mounted between two guide members for sliding movement across the top of the cylinder. The guide members, which are mounted adjacent the top of the tubular cylinder, are both inclined at an angle of about 45° so that they hold the flat plate of the carriage parallel to the top of the tubular cylinder. The opening in the base plate is preferably of substantially the same cross sectional area as the horizontal cross section of the hollow interior of the tubular cylinder.

When the opening in the base plate is in vertical alignment with the tubular cylinder it constitutes an extension of the hollow interior of said cylinder. The lower cylindrical edge of the inverted scaling cup seals the upper edge of the opening in the base plate. The bottom surface of the base plate seals the top of the tubular cylinder when it extends over said top. When the opening in the flat base plate extends over the top of the cylinder, the inverted scaling cup cooperates with the flat base plate to seal the top of the tubular cylinder.

As the base plate of the carriage moves across the top of the cylinder, the edges of the base plate defining the opening therein cut off part of the dough in the tubular cylinder which is being pushed upwardly by a piston mounted in the cylinder. A spring pressed flat disk is mounted in the inverted scaling cup to limit the quantity of dough that may be pushed into the cup by the piston as the carriage is moved past the top of the cylinder. A stop member is adjusted to limit the upward movement of the flat disk in the scaling cup to regulate the capacity of the scaling cup. The stop member may be adjusted to adjust the capacity of the scaling cup anywhere from about one half ounce to aboue twenty three ounces. The scaling cup can never remove more dough than the amount for which it is set. Whenever an excess of dough accumulates in the tubular cylinder, the pressure of extra dough causes the piston, which has a double action, to skip one reciprocatory movement while the scaling cup removes its regular amount of dough.

As the carriage reaches the outer end of its movement, the dough is pushed out of the scaling cup by the flat disk, which is spring pressed, on to a conveyor. Since the upper surface of the piston is parallel to the flat disk mounted in the scaling cup, the dough is pushed out of the inverted scaling cup in the form of a cylindrical disk having flat, parallel top and bottom surfaces. As the cylindrical disk of dough is moved toward the discharge end of the conveyor it is engaged by an inverted trough that cooperates with the conveyor to roll the dough into the shape of a ball. The inverted trough may be adjusted to cooperate with different quantities of dough.

The apparatus by means of which the above mentioned and other advantages of the invention are attained will be fully described in the following specification, taken in conjunction with the accompanying drawings showing a preferred illustrative embodiment of the invention, in which:

FIG. 1 is a fragmentary perspective view of an apparatus embodying the invention;

FIG. 2 is a front elevational view of the dough dividing machine with the front plate of the frame removed to facilitate illustration of the driving mechanism;

FIG. 3 is a rear elevational view of the dough dividing machine with the rear plate of the frame removed;

FIG. 4 is an end elevational view of the dough dividing machine looking from the left of FIG. 2;

FIG. 5 is a vertical sectional view of the machine, taken along the line 5—5 of FIG. 2; and FIG. 6 is an enlarged fragmentary vertical sectional view of the double action piston.

The apparatus of the present invention comprises a dough dividing machine 11 and a conveyor 12. The machine 11 has a frame 14 comprising an upstanding front plate 15 and a rear plate 16 held in parallel spaced relationship by a plurality of transverse tie rods 17. A motor 18 is mounted on a support plate 19 within the frame 14. A sheave 20, mounted on the output shaft 21 of the motor, drives a second sheave 22 by means of an endless belt 23 extending over both sheaves. The sheave 22 and a gear 25 are both keyed to a shaft 24.

A gear 26, keyed to a shaft 27, is meshed with the gear 25. The gear 26 has a cam track 28 cut into one side.

A cam roller 29 is rotatably mounted on a stub shaft 30 and has one end extending into the cam track 28. The cam roller 29 controls the movement of one end of a bell crank 31 to which the stub shaft is fixed. The other end of the bell crank is provided with a pin 32 that fits into a U-shaped bracket 33 that depends from the base plate of a carriage 34. The carriage 34 is reciprocated, in a manner hereinafter described, by the bell crank. The bell crank is pivoted intermediate its length, as indicated at 35, to a lug 36 slidably mounted in a laterally elongated slot 37 in a stationary plate 38. The bell crank is bent angularly, as indicated at 31', between the pivot 35 and the pin 32 to permit the pin 32 to be engaged with the U-shaped bracket 33.

The carriage 34 is mounted for sliding movement across the top of an open top tubular cylinder 39. The tubular cylinder is vertically disposed, but its upper end is cut at an angle of about 45°. Two guide members 40 and 41 are mounted in parallel relationship adjacent the lowermost and the uppermost portions, respectively, of the upper edge of the tubular cylinder. The guide members 40 and 41 are inclined at an angle of about 45° to the vertical axis of the tubular cylinder, and are provided with inwardly extending longitudinal flanges 42 and 43, respectively. The flanges 42 and 43 are parallel to the plane of the angularly inclined upper edge of the tubular cylinder 39, and are spaced therefrom.

The carriage 34 comprises a flat base plate 44 having an opening 45 adjacent one end of the said base plate, and an inverted scaling cup 46. The base plate 44 is seated on the upper edge of the tubular cylinder 39 and fits between the guide members 40 and 41. The flanges 42 and 43 overlie the longitudinal edges of the carriage 34 and hold it against vertical displacement. The reciprocatory travel of the carriage across the upper edge of the tubular cylinder moves the opening 45 into registration with the top of the tubular cylinder during each reciprocation of the carriage.

The inverted scaling cup 46 comprises a tubular cylindrical wall 47 and an apertured top closure 48. The cylindrical wall 47 surrounds the opening 45 and has its lower edge rigidly secured to the base plate 44. The joint between the cylindrical wall and the base plate is sealed, preferably by welding. A flat disk 49 is slidably mounted in the inverted scaling cup 46 with its peripheral edge fitting close enough to the inner surface of the cylindrical wall 47 to prevent any dough from passing therebetween. A pin 50, secured to the upper surface of the flat disk 49 projects through the aperture in the top closure. The pin 50 is secured to the top closure 48 by a nut 51. A spring 52 is coiled around the pin 50 between the flat disk 49 and the top closure 48 to exert pressure urging the flat disk 49 downwardly. The upward movement of the disk 49 is limited by any suitable adjustable stop means, as, for example, a screw threaded through a tapped aperture in the top closure 48 and engageable with the upper surface of the flat disk 49.

The reciprocatory travel of the carriage 34 is controlled by the bell crank 31. As the gear 26 is rotated in one direction, the interengagement of the cam roller 29 and the cam track 28 causes the upper end of the bell crank to oscillate in a shallow arc. The U-shaped bracket 33 permits the pin 32 to move vertically as the bell crank is moved from one end of its movement to the other. Since the bracket 33 is rigidly secured to the carriage 34, the carriage is reciprocated by the movement of the bell crank. The movement of the carriage positions the inverted scaling cup over the conveyor 12 at one end of said movement, and over the tubular cylinder at another part of its travel.

A piston 53, slidably mounted in the tubular cylinder 39, has its top cut at an angle of 45°, as indicated at 54, to provide an inclined upper surface that is parallel to the plane of the upper edge of the cylinder. The bottom of the tubular cylinder is supported by a flat annular plate or block 55 having an aperture 56 concentric with the tubular cylinder. The aperture 56 is smaller in diameter than the tubular cylinder, and the plate or block 55 provides an annular shoulder 57 upon which the bottom of piston 53 is seated. A piston rod 58 is secured to the bottom of piston 53 by a collar 59.

A crank pin 60, mounted eccentrically on the gear 26, has a sleeve 61 rotatably mounted thereon. A tubular post 62, fixed to the sleeve 61 extends upwardly in telescopic engagement with the piston rod 58. A compression spring 63, coiled around the tubular post 62 and the piston rod 58, has one end secured to the collar 59 and its other end secured to the sleeve 61. The tubular post 62 has a vertical slot 64 closed at both ends and extending throughout substantially its entire length. A pin 58' projecting laterally from the piston rod 58 near its lower end projects into the vertical slot 64.

The dough is fed into the tubular cylinder 39 from a hopper 65 that comprises a receptacle 66 and a discharge chute 67 secured to the upper edge portion of the tubular cylinder 39. The lower portion of the receptacle 66 is conical, as indicated at 68, and is secured in any suitable manner to a flat plate 69 that forms the top of the discharge chute. Preferably the receptacle 66 is removably mounted on the flat plate 69 to facilitate cleaning the hopper. The bottom of the conical portion 68 of the receptacle is open, and registers with an opening 70 in the plate 69. The opening 70 is the discharge opening through which the dough from the hopper flows into the chute 67. The chute 67 extends from the underside of the flat plate 69 to the outer surface of the tubular cylinder 39, and its edges are secured to the outer surface of the tubular cylinder in registration with the inlet opening 39'.

When dough is put into the hopper, gravity causes it to flow downwardly through the discharge opening 70 and into the chute 67. When the inlet opening 39' is closed by the side of the piston 53, the space in the tubular cylinder between the top of the piston and the top closure member is sealed. This space remains completely sealed as the piston moves downwardly in the tubular cylinder, and the downward movement of the piston creates suction that draws the dough through the inlet opening into the tubular cylinder.

The rotation of the gear 26 causes the crank pin 60 to move the compression spring 63 vertically. When the spring moves downwardly, it pulls the piston downwardly in the tubular cylinder. Unless an excessive quantity of dough is in the tubular cylinder above the piston, the spring 63 acts as a solid member, and pushes the piston upwardly in the tubular cylinder as it is moved upwardly by the crank pin 60.

On the upward stroke of the piston, the uppermost edge of the piston moves into engagement with the dough extending through the inlet opening and starts to cut it off adjacent the lowermost edge of the inlet opening. The angle of inclination of the top surface of the piston makes said edge rather sharp, thus increasing the efficiency of the piston as a cutting element. The angularity of the top of the piston guides the dough inwardly of the tubular cylinder as it is cut off from the mass of dough in the chute. As the piston moves upwardly past the inlet opening, it seals the inlet opening and pushes the dough upwardly in the tubular cylinder. At the same time, the bell crank 31 is moving the carriage 34. As the opening 45 in the base plate of the carriage moves into vertical alignment with the top of the tubular cylinder, the piston pushes enough dough upwardly through the opening 45 into the inverted scaling cup 46 to completely fill the portion of the scaling cup below the flat disk 49. The upward movement of the flat disk is limited by any suitable stop means, and the dough in the cup is pressed into cylindrical shape against the bottom surface of the flat disk.

The movement of the carriage 34 is so timed that it moves the opening 45 out of registration with the open top of the tubular cylinder 39 as the dough is pressed against the disk 49. The edge of the flat base plate contiguous to the opening 45 serves as a cut-off tool to sever the dough in the scaling cup from the dough in the tubular cylinder. The carriage continues its movement until the opening 45 is positioned above the conveyor 12, at which time the spring pressed disk moves downwardly to discharge the flat disk of dough from the scaling cup on to the conveyor.

Although the amount of dough sucked into the tubular cylinder on each downward stroke of the piston is fairly uniform, the amount removed by the scaling cup might be slightly less than the amount of dough sucked into the tubular cylinder, so that the amount of dough in the tubular cylinder builds up gradually. The increase in the amount of dough in the tubular cylinder increases the resistance to the upward movement of the piston, until it becomes so great that the piston cannot push additional dough from the cylinder upwardly into the inverted scaling cup.

When the tubular cylinder contains an excessive amount of dough, the resistance of the dough in the tubular cylinder to the upward movement of the piston is greater than the compressive force of the spring 63. Under these conditions the spring 63 is unable to move the piston 53 upwardly, and is compressed by the upward movement of the crank pin. The piston remains stationary throughout the revolution of the crank pin about the axis of gear 26. The tubular post 62 moves upwardly relative to the piston rod 58, and the slot 64 moves upwardly about the pin 58'. The bell crank reciprocates the carriage 34 during the revolution of the crank pin referred to, and the scaling cup removes its normal load of dough from the interior of the tubular cylinder in the usual manner. The removal of dough from the cylinder by the scaling cup relieves the pressure of the dough against the upward movement of the piston within the tubular cylinder, since no dough is sucked into the tubular cylinder during the particular revolution of the crank pin. The amount of dough that might flow from the chute into the tubular cylinder by gravity alone is negligible.

The conveyor 12 comprises an endless belt 71 that extends around two parallel spaced rolls 72, at least one of which is driven, by any suitable means, to provide a continuous movement for the conveyor. The upper reach 73 of the conveyor underlies the discharge end of the dough dividing machine, so as to receive the cylindrical disks of dough pushed out of the inverted scaling cup 46 by the spring pressed disk 49, and moves outwardly to carry the dough away from the machine.

A strip 74 of any suitable material, such as, for example, metal or plastic, curved in substantially semicylindrical shape, is adjustably supported by rods 75 and 76 extending from brackets 77. The rod 75 is longer than the rod 76, and the strip 74 is positioned diagonally of the upper reach 73 of the conveyor. The strip 74 may be adjusted radially or vertically by any suitable means. The end of strip 74 closest to the dough dividing machine 11 is so located, that each cylindrical disk of dough discharged on to the upper reach of the conveyor by the disk 49 is carried into engagement with the strip immediately after it drops on the conveyor.

The angle at which the strip 74 is disposed, relative to the upper reach of the conveyor, causes each cylindrical disk of dough discharged on to the upper reach of the conveyor to continually bump against the strip and bounce away a short distance from the strip as the conveyor carries it toward its discharge end. The continuous bumping and bouncing action on the cylindrical disk of dough causes it to change its shape to conform to the cross sectional curvature of the strip 74 so that it is in ball shape as it approaches the discharge end of the conveyor. The adjustability of the strip 74 relative to the upper reach 73 of the conveyor enables the strip to change cylindrical disks of dough of various amounts into balls of dough. The ball shape into which the dough is formed is preferred for storage of the dough in frozen condition.

While we have described a preferred embodiment of our invention in considerable detail, it will be understood that the description thereof is intended to be illustrative, rather than restrictive, as many details of structure may be modified or changed without departing from the spirit or scope of our invention. Accordingly, we do not desire to be restricted to the exact structure described.

We claim:

1. A dough dividing apparatus comprising a hopper for holding a supply of dough, an open top tubular cylinder adjacent said hopper, a piston movable in said cylinder to create suction for moving dough from said hopper into said cylinder, an inverted scaling cup having an open end positioned in a plane above the open top of said cylinder, means for moving said scaling cup into and out of registration with said cylinder, means for moving said piston upwardly to push dough from said cylinder into said scaling cup when said scaling cup is in registration with said cylinder, and means for discharging dough from said scaling cup when it is out of registration with said cylinder.

2. A dough dividing apparatus comprising a hopper for holding a supply of dough, an open top tubular cylinder adjacent said hopper, a piston movable in said cylinder to create suction for moving dough from said hopper into said cylinder, an inverted scaling cup having an open end positioned in a plane above the open top of said cylinder, means for moving said scaling cup into and out of registration with said cylinder, means for moving said piston upwardly to push dough from said cylinder into said scaling cup when said scaling cup is in registration with said cylinder, a conveyor adjacent said cylinder, said first mentioned means moving said scaling cup over said conveyor, means for discharging dough from said scaling cup onto said conveyor, and adjustable means positioned above said conveyor for engaging dough discharged from said scaling cup and rolling it into ball shape.

3. A dough dividing apparatus comprising a hopper for holding a supply of dough, a discharge opening at the bottom of said hopper, an open top tubular cylinder having an inlet opening in its side, said inlet opening communicating with said discharge opening, a piston slidably mounted in said cylinder, a carriage mounted for sliding movement across the top of said cylinder, said carriage including a flat base plate having an opening adapted to register with the open top of said cylinder as it is moved across the top of said cylinder, an inverted scaling cup extending upwardly from said flat base plate, said scaling cup having an open end in registration with the opening in said flat plate, means for reciprocating said piston and said carriage in a definite timed relationship, said piston creating suction in said cylinder during its downward movement to suck dough from said hopper into said cylinder, said piston pushing the dough from said cylinder into said scaling cup during the upward movement of said piston as said scaling cup is moved past the top of said cylinder, and means in said scaling cup for discharging dough from said scaling cup.

4. A dough dividing apparatus comprising a hopper for holding a supply of dough, a discharge opening at the bottom of said hopper, an open top tubular cylinder having an inlet opening in its side, said inlet opening communicating with said discharge opening, a piston slidably mounted in said cylinder, a flat plate mounted for sliding movement across the top of said cylinder, said flat plate having an opening adapted to register with the open top of said cylinder as it is moved across the top of said cylinder, an inverted scaling cup extending upwardly from said flat plate, said scaling cup having an open end in registration with said opening in said flat plate, and means for reciprocating said piston and said flat plate, said piston creating suction in said cylinder as it is moved downwardly to suck dough from said hopper through said inlet opening into said cylinder, said piston cutting the dough extending through said inlet opening and pushing it into said scaling cup as said piston is moved upwardly and said scaling cup is moved past the top of said cylinder, said piston having an inclined top surface with the uppermost edge of said top surface aligned vertically with said inlet opening to facilitate cutting the dough extending into the cylinder adjacent said inlet opening.

5. A dough dividing apparatus compirsing a hopper for holding a supply of dough, a discharge opening at the bottom of said hopper, an open top tubular cylinder having an inlet opening in its side, said inlet opening communicating with said discharge opening, a piston slidably mounted in said cylinder, a flat plate mounted for sliding movement across the top of said cylinder, said flat plate having an opening adapted to register with the open top of said cylinder as it is moved across the top of said cylinder, an inverted scaling cup extending upwardly from said flat plate, said scaling cup having an open end in registration with the opening in said flat plate, a gear, means for rotating said gear, an eccentric crank pin and a cam track on opposite surfaces of said gear, a cam follower in said cam track, a linkage connected to said cam follower and said flat plate for reciprocating said flat plate as said gear is rotated, and a rod connecting said crank pin to said piston for reciprocating said piston as said gear is rotated, said piston creating suction in said cylinder as it is moved downwardly to suck dough from said hopper through said inlet opening into said cylinder, and said piston pushing the dough from said cylinder into said scaling cup as said piston is moved upwardly and said scaling cup is moved past the top of said cylinder.

6. A dough dividing apparatus comprising a hopper for holding a supply of dough, a discharge opening at the bottom of said hopper, an open top tubular cylinder having an inlet opening in its side, said inlet opening communicating with said discharge opening, a piston slidably mounted in said cylinder, a flat plate mounted for sliding movement across the top of said cylinder, said flat plate having an opening adapted to register with the open top of said cylinder as it is moved across the top of said cylinder, an inverted scaling cup extending upwardly from said flat plate, said scaling cup having an open end in registration with the opening in said flat plate, a gear, means for rotating said gear, a linkage connecting said gear to said flat plate for reciprocating said flat plate as said gear is rotated, means connecting said gear to said piston for reciprocating said piston as said gear is rotated, said piston creating suction in said cylinder as it is moved downwardly to suck dough from said hopper through said inlet opening and pushing dough from said cylinder into said scaling cup as it is moved upwardly, a disk movable inwardly to a limited extent in said scaling cup to limit the amount of dough pushed into said scaling cup, and means holding said piston against reciprocation in said cylinder as said gear is rotated when the cylinder contains an excessive amount of dough.

7. A dough dividing apparatus comprising a hopper for holding a supply of dough, a discharge opening at the bottom of said hopper, an open top tubular cylinder having an inlet opening in its side, said inlet opening communicating with said discharge opening, a piston slidably mounted in said cylinder, a piston rod depending from said piston, a flat plate mounted for sliding movement across the top of said cylinder, said flat plate having an opening adapted to register with the open top of said cylinder as it is moved across the top of said cylinder, an inverted scaling cup extending upwardly from said flat plate, said scaling cup having an open end in registration with the opening in said flat plate, a gear, means for rotating said gear, a crank pin mounted eccentrically on said gear, a sleeve rotatably mounted on said crank pin, a tubular post in telescopic engagement with said piston rod, said tubular post being rigidly secured to said sleeve, and a compression spring encircling said piston rod and said tubular post, said spring being compressed between said piston and said sleeve with sufficient force to move said piston upwardly against a predetermined weight of dough against the top of said piston during the rotation of said crank pin in an upward direction, said spring being compressible during the upward rotation of said crank pin when an excessive weight of dough acts against the top of said piston to hold said piston against upward movement.

8. A dough dividing apparatus comprising a hopper for holding a supply of dough, a discharge opening at the bottom of said hopper, an open top tubular cylinder having an inlet opening in its side, said inlet opening communicating with said discharge opening, a piston slidably mounted in said cylinder, a flat plate mounted for sliding movement across the top of said cylinder, said flat plate having an opening adapted to register with the open top of said cylinder as it is moved across the top of said cylinder, an inverted scaling cup extendingly upwardly from said flat plate, said scaling cup having an open end in registration with the opening in said flat plate, a gear, means for rotating said gear, and means connected to said gear for reciprocating said flat plate and said piston as said gear is rotated, said means for reciprocating said piston including a compression spring capable of moving said piston upwardly when said upward movement is resisted by a load of dough of predetermined weight, said spring being compressible when the upward movement of said piston is resisted by a load of dough in excess of said predetermined weight to hold said piston against upward movement during the reciprocation of said flat plate.

9. A dough dividing apparatus as recited in claim 1, in which said second mentioned means comprises a crank pin movable about a horizontal axis and a compression spring connected at one end to said crank pin and bearing against said piston at its other end, said spring being compressible by the pressure of dough in said cylinder in excess of a predetermined amount whereby said piston maintains its lowermost vertical position in said cylinder against the vertical movement of said crank pin when said cylinder contains dough in excess of said predetermined amount.

References Cited by the Examiner
UNITED STATES PATENTS

| | | | |
|---|---|---|---|
| 571,774 | 11/1896 | Lewis et al. | 107—15 |
| 2,329,287 | 9/1943 | Miller | 264—297 |
| 2,329,288 | 9/1943 | Miller | 264—297 |
| 2,774,104 | 12/1956 | Miller | 107—8 |

FOREIGN PATENTS

| | | |
|---|---|---|
| 316,622 | 7/1930 | Great Britain. |
| 1,371,836 | 8/1964 | France. |

WALTER A. SCHEEL, *Primary Examiner.*

J. SHEA, *Assistant Examiner.*